(No Model.)
C. W. PRESTON.
CALIPER FOR MEASURING DISTANCES.
No. 509,096. Patented Nov. 21, 1893.
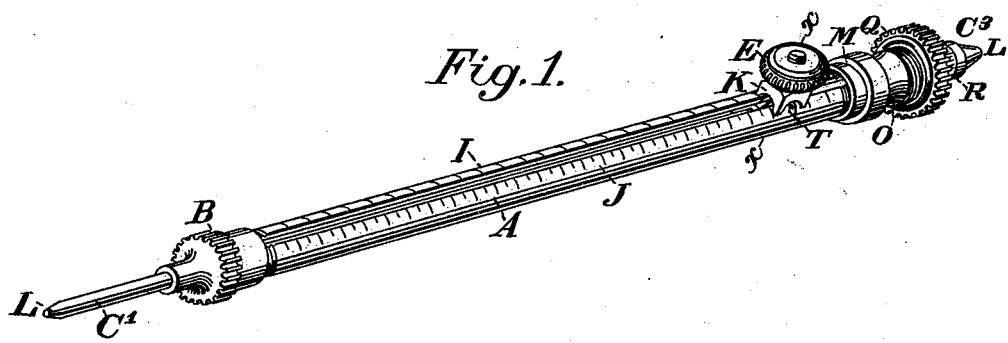
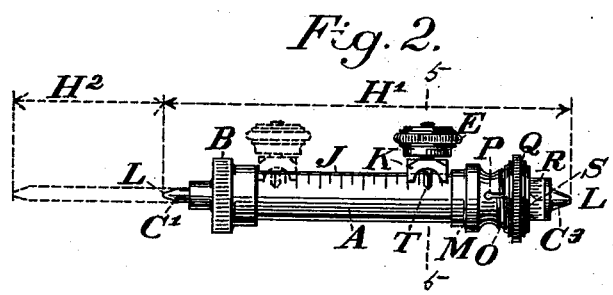
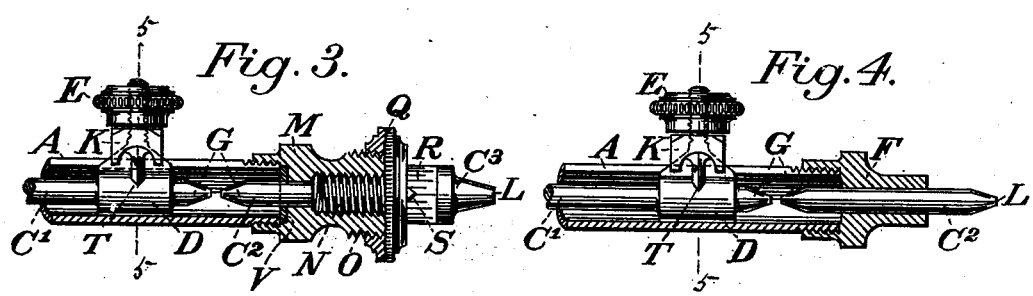
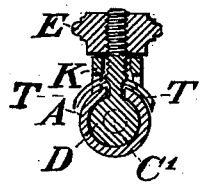
Witnesses:
E. A. Brandau
Wilson D. Bent Jr.
Inventor:
Chas. W. Preston
By John Richards
Atty

UNITED STATES PATENT OFFICE.

CHARLES W. PRESTON, OF SAN FRANCISCO, CALIFORNIA.

CALIPERS FOR MEASURING DISTANCES.

SPECIFICATION forming part of Letters Patent No. 509,096, dated November 21, 1893.

Application filed June 17, 1893. Serial No. 477,984. (No model.)

*To all whom it may concern:*

Be it known that I, CHARLES WILLIAM PRESTON, a citizen of the United States, residing in the city and county of San Francisco, State of California, have invented certain new and useful Improvements in Instruments for Measuring Distances, and also forming a standard continuous scale or gage for reference, from which other instruments or implements can be made or compared therewith; and I hereby declare the following specification and the drawings therewith to be a full, clear, and exact description of my improvements, with the manner of constructing and applying the same.

My invention relates to instruments employed in metrology, and also to practical work, forming when so adjusted, standards for length, and adjustable so as to ascertain or transfer accurately distances between surfaces by means of contact points, so constructed as to avoid derangement by changes of temperature from the hands of those using the instruments, and from contact with or exposure to surfaces or bodies having a higher or lower temperature than the standard at which the instruments are adjusted.

My invention consists of a tube within which is placed a measuring rod in two or more sections, which combined or extended make up a unit or some division or multiple of a unit employed, such as the quarter, half, or whole of a foot, yard, or meter, also when extended makes another unit or division thereof. One end of the rod being firmly attached to the inclosing tube, the other part of the rod sliding therein, the tube provided with visual scales corresponding to the divisions of the unit employed; also includes for certain accurate purposes in measuring distances, a vernier attachment for accurately determining slight variations that cannot be read from the visual scales before named, and in adjustment to fixed distances.

My invention also includes modifications of my improved instruments, for purposes more or less accurate, and in constructing them in series as to length or capacity, so that by adjustment and combination they will apply to all distances within the range required in use, as illustrated in the accompanying drawings, in which—

Figure 1 is a perspective elevation of one of my improved implements. Fig. 2 is a side view of the same, showing how when open and closed it forms units of length or divisions thereof. Fig. 3 is a longitudinal section through the operating parts of the instrument, with the auxiliary or vernier attachment applied. Fig. 4 is another longitudinal section, showing the fixed or permanent rods making up a unit of distance when the instrument is closed. Fig. 5 is a transverse section in the line 5—5 of the other figures of the drawings.

Similar letters of reference are employed to designate like parts throughout.

In constructing my improved instruments, I employ a slotted stem or tube A, having at one end a head B, through which passes loosely the main measuring rod C'. This rod at its inner end is supported in a movable head or bearing D, which slides loosely in the tube A and is clamped at various points by the thumb nut E, as will be more fully explained farther on. This sliding head D when the instrument is extended abuts against the interior of the head B, forming a rigid stop, and determining accurately the extended length. For ordinary use, and when the vernier attachment is not required, the other end of the tube A is fitted with a head F, Fig. 4, in which is fixed permanently the short section C² of the measuring rod. These rods C' and C² are held in true alignment in the center of the tube A, and are prepared with reduced and hardened points G, that abut together when the rod C² is drawn back as shown in Fig. 2. In this position the sum of the length of both rods, or the distance H' in Fig. 2, is adjusted carefully to some unit such as a foot or a multiple thereof, from which, as a base, the rod C' can be adjusted outward, reading from the scales I or J by means of a pointer T, the distance moved, so the points L can be set to span, transfer or determine any measure or distance as accurately as the scales I and J can be read by means of the pointer T, which has a knife edge on the measuring side which can be adjusted to the edge of the graduated lines on the tube. When adjustment is made of the rod C' it is firmly clamped by means of the head D which is of the nature of an eye bolt, the cylindrical portion being drawn firmly outward against the slotted side of the tube A, the strain being opposed by the saddle piece K, which fits on the exterior of the tube A as the head D does on the inside, so the clamping action will not strain or distort the tube. The instruments I arrange in series, so the sum of the distances H' H², Fig. 2, will equal the distance H' of the next longer instrument, and so the distance H' will equal the extended length H' and H² of the next shorter instrument, so as to cover or include all lineal measures between some predetermined range for the series.

To prevent wear or abrasion in removing and replacing the head Q I provide hardened surfaces to abut on the ends of the tube A. This can be done by hardening the tube, and inserting a hardened collar or ring V, Fig. 3, or in any other suitable manner so that no wear will occur, and the length when once adjusted will not vary. The enlarged section or head D can also be of hardened material, and a hardened collar set in the head B, so the extended length of the instruments will not change by wear or abrasion.

For accurate adjustment I provide an independent head, called here for convenience a vernier one, as shown in Figs. 1, 2 and 3. In this case the rod C² can be considered as made in two parts, the one C³ being an extension of C². This extension C³ is supported in a separate head M, which replaces the one F when the vernier is to be used. The pin C³ has on its inner end a fine thread N, fitting into the sleeve O, which is split to render it flexible, as shown at P, Fig. 2, and is provided with a thumb collar nut Q, fitting up with a taper, so that when screwed up, the extension piece C³ is firmly nipped and held in the head M. To determine distances this extension C³ is provided with a scale R on its periphery that is read from a pointer S in the usual manner, so that by loosening and revolving the extension C³, minute distances to thousandths of an inch can be seen and determined. Such accurate adjustment is required only for comparing or ascertaining by touch, minute measures that cannot be read from the scales I and J with sufficient accuracy. These scales I and J on the tube A, are by preference made to divisions of a foot or inches on one side, and for metrical measures on the other, but can conform to any desired standard.

In using my improved instruments it will be seen that the rods C' C² being inclosed in the tube A but not in contact therewith, and having a stratum of air around them, are protected from heat or cold by convection or radiation, and not subjected to changes of temperature, as is the case with uncovered rods or metal-measuring implements of any kind.

Having thus explained the nature and objects of my invention, what I claim as new and desire to secure by Letters Patent, is—

1. In a measuring instrument and gage as herein described, a slotted tube in which two or more measuring rods or elements are contained, and so disposed as to have an annular space of air around them to prevent change or derangement by heat of the hands or from other cause, in the manner substantially and for the purposes described.

2. In a measuring implement as herein described, a containing tube forming a stem or support; movable and fixed measuring rods therein, abutting together, also abutting against stops, and forming when combined, or extended, a gage from which relative dimensions can be derived or determined, in the manner substantially as herein specified and shown.

3. In a measuring instrument and gage as herein described, a slotted tube having movable and fixed measuring or gage rods, the movable rod provided with a sliding head, or enlargement, fitting loosely in the bore of the tube, a thumb-screw and external saddle pieces spanning the slot in the tube, and bearing on each side thereof so the movable rod may be firmly clamped and held at any point without straining or distorting the containing tube, in the manner substantially as and for the purposes specified.

4. In a measuring instrument and gage, as herein described, a slotted containing tube having fixed and movable measuring or gage rods, the movable rod held at its inner end by a collar or head fitting loosely in the bore of the tube, and abutting against a permanent stop when extended; a saddle piece on the outside of the tube spanning and bearing on both sides of the slot therein, a graduated scale on one or both sides of the slot and a pointer or pointers to indicate on these scales dimensions or distances between the outer contact points of the measuring rods, in the manner substantially as and for the purposes specified.

5. In a measuring instrument and gage, as herein described, a slotted containing tube with fixed and movable contact points, the heads of the tube being screwed on and removable, one forming a loose bearing for the adjustable measuring rod, and the other provided with an auxiliary measuring rod or point, the two rods abutting, and forming when so adjusted, a gage for some predetermined unit of length or multiple thereof, in the manner substantially as and for the purposes specified.

6. In a measuring instrument and gage, as herein described, a slotted containing tube in combination with one fixed and one removable head, the latter interchangeable with a vernier pin and scale, to be employed in accurate adjustments, consisting of a threaded revolving pin, a scale and pointer as herein shown, so arranged that when the instrument is closed or at its shortest length, the measuring elements will abut, one on the other positively, and thus form a standard gage of reference, in the manner substantially as and for the purposes described.

7. In a measuring implement and gage as herein described, a slotted containing tube with a movable measuring rod; scales and pointers as shown, one end of the rod provided with a head forming a sliding bearing for the main measuring rod, and the other end having a head with split socket and an adjustable vernier pin fitting therein, a clamping nut and vernier scale for minute adjustments, in the manner substantially as and for the purposes specified.

In testimony whereof I have hereunto affixed my signature in the presence of two witnesses.

CHARLES W. PRESTON.

Witnesses:
ALFRED A. ENQUIST,
WILSON D. BENT, Jr.